United States Patent [19]

Sato et al.

[11] 4,108,720

[45] Aug. 22, 1978

[54] CONTROL SYSTEM FOR BOILING-WATER REACTOR

[75] Inventors: Takao Sato, Ibaraki; Sakae Sugiyama, Hitachi, both of Japan

[73] Assignee: Hitachi, Ltd., Japan

[21] Appl. No.: 595,330

[22] Filed: Jul. 11, 1975

[30] Foreign Application Priority Data

Jul. 15, 1974 [JP] Japan .................................. 49-80127

[51] Int. Cl.$^2$ ............................................... G21C 7/00
[52] U.S. Cl. .................................... 176/20 R; 176/24; 176/54
[58] Field of Search ............... 176/19 R, 19 EC, 19 J, 176/20 R, 24, 25, 54

[56] References Cited

U.S. PATENT DOCUMENTS

| | | | |
|---|---|---|---|
| 3,042,600 | 7/1962 | Brooks | 176/56 |
| 3,197,376 | 7/1965 | Bulent et al. | 176/19 R |
| 3,202,804 | 8/1965 | Schlein | 176/24 |
| 3,551,289 | 12/1970 | Eich et al. | 176/35 |
| 3,565,760 | 2/1971 | Parkos et al. | 176/19 R |
| 3,630,839 | 12/1971 | Podolsky | 176/20 |
| 3,671,390 | 6/1972 | Hogle | 176/20 R |
| 3,778,347 | 12/1973 | Giras et al. | 176/20 R |
| 3,931,500 | 1/1976 | Berkebile et al. | 176/24 |

OTHER PUBLICATIONS

Nuclear Engineering International, (1/75), pp. 43–47.

*Primary Examiner*—Stephen C. Bentley
*Assistant Examiner*—S. A. Cangialosi
*Attorney, Agent, or Firm*—Craig & Antonelli

[57] ABSTRACT

A plurality of local power range monitors are provided in the core of a nuclear reactor and the total output of the reactor is obtained from the outputs of the monitors. The output of the reactor, if it reached its equilibrium state, will normally keep a constant value, but after the load is changed, the output is also varied by the influence of the neutron absorbing property of the fission products generated as a result of the load change, and especially after the reactor output has been increased, it is spontaneously increased over its setting value to cause the reactor to overheat. The minimum allowable recirculating flow which prevents the overheat at a given total output, is obtained on the basis of the total output. If the actual recirculating flow is larger than the minimum allowable flow, the recirculating flow is freely controlled, but if the actual flow is smaller than the minimum value, the control of the recirculating flow is prohibited and the control rods are inserted for the control of the reactor output. The insertion begins with one of the control rods near the local power range monitor whose output is the maximum.

13 Claims, 7 Drawing Figures

CONTROL SYSTEM FOR BOILING-WATER REACTOR

BACKGROUND OF THE INVENTION

1. Field of the Invention

The present invention relates to a system for controlling the output of an atomic power plant using a boiling-water reactor and more particularly to a control system for preventing the overheating of fuel assembly in the reactor and for securing a safety response to the change in reactor load.

2. Description of the Prior Art

There are several factors which are theoretically associated closely with the control of the output of a boiling-water reactor. Of those factors, the method of adjusting the position of control rod and the method of controlling the recirculating flow are preferably in practical application. The reactor has several tens of control rods inserted in the reactor core, each control rod being made of, for example, boron which is a substance having a property of absorbing neutrons and each control rod being surrounded by several fuel rods. The fuel rods or slugs generate heat due to nuclear fission and the quantity of heat to be generated will be changed by the change in the number of neutrons which cause the following chain-reaction. The control rod serves to absorb the neutrons for the purpose of controlling the heat generation in the reactor. The deeper are the control rods inserted into the core of the reactor, the greater is the number of the absorbed neutrons and therefore the smaller is the quantity of heat generated. On the other hand, the farther are they withdrawn from the core of the reactor, the smaller is the number of the absorbed neutrons and the greater is the quantity of generated heat. The feature of this output control by adjusting the position of control rods is that the quantity of heat generated only in the neighboring fuel rods is changed but that in the remote fuel rods cannot be controlled. Thus, the region of control by each control rod is local so that local power range monitors are provided in the vicinity of the fuel rods. In a typical example, four fuel rods are arranged about a single control rod and four local power range monitors are disposed in the vicinity of one of the four fuel rods, along the axial direction thereof. The local power range monitors detect the neutron flux. A plurality of blocks, each consisting of a control rod, four fuel rods and four local power range monitors, constitute the core of a reactor. The core is located in the center of the reactor, usually immersed in water which is used as a coolant and moderator. Another practical method of controlling the output of the reactor is to control the recirculating flow of coolant. According to the method, for example, the water in the upper part of the reactor is drawn out, pressurized by the recirculation pump and recirculated from the lower to upper portion of the reactor, with the velocity of the flow of the recirculating water controlled. In this case, the amount of void (foam) created in the reactor depends on the temperature of the void generating surface: the greater is the recirculating flow, that is, the higher is the effect of cooling, the smaller is the amount of generated void. The void has a negative reactivity so that the amount of void generated in the reactor affects the output of the reactor. Namely, if the recirculating flow is increased to promote cooling efficiency, the void is decreased and the reactor output is also increased, and if the recirculating flow is decreased to reduce the cooling capacity, the void is increased to decrease the reactor output. The feature of the control of recirculating flow is the uniform distribution of heat generation in the direction of radius for the reactor core. It is therefore considered that the change in the reactor output due to the adjustment of the control rod is local while the change due to the control of the recirculating flow is uniformly spread over the core.

As described above, there are two practical method of controlling the output of the boiling-water reactor and they contribute differently to the reactor output so that they are usually used in combination. Namely, the local control by the control rod alters the steady state distribution of the output in the reactor core and may sometimes damage some particular fuel rods due to overheating caused when the rod is withdrawn while the general control by controlling the recirculating flow is restricted by the ratings of the recirculation pump, i.e. the maximum and minimum rpm's of the pump. For these reasons, the operation to withdraw the control rods when the reactor is at the high output performance is prohibited. The operation to withdraw the control rods is permitted only when the reactor is delivering less than about 50% of the rated output. In an operating range where the reactor is delivering more than about 50% of the rated output, the control of recirculating flow is exclusively employed.

The conventional atomic power plants are run with their loads fixed constant in view of safety of the reactor. However, it will be necessary in the near future to run several atomic power plants under variable load following since the proportion of the electric power generated by atomic power plants to that generated by other system will have been increased due to the future increase in the number of atomic power plane installations. It will be able to operate under variable load following since the safety and reliability of the reactor will have been improved through the experience obtained due to years of running. The most important thing in this case of variable load performance is the relationship between the reactor output and the coolant flow through the core of the reactor (approximately proportional to the recirculating flow), that is, it is necessary that the coolant flow through the reactor core should be sufficient to match the corresponding reactor output, irrespective of whether the output is changed by control rods or recirculating flow of coolant, so as not to overheat the core assembly and its associated members.

As for the control rods, a means for preventing the local overheat due to the withdrawal of the control rod has been proposed. This means is termed "rod block monitor" and the rod block monitor compares the recirculating flow with the outputs of the local power range monitors in the vicinity of the control rod to be withdrawn and when the outputs are greater than the maximum allowable output determined by the recirculating flow, the withdrawal of the particular control rod is prevented. In other words, the control rods can be withdrawn only when the reactor core is sufficiently cooled.

As regards the control of recirculating flow, no means for preventing the overheat of the members in the reactor has not yet been taken into consideration. It has been proved, however, that such a means is essential even in the case of the recirculating flow control if the reactor output is changed to a great extent. During the course of operation of a nuclear reactor, the fission fragments and their many decay products are produced and accumulated. These products are normally generated in proportion to the reactor output and have a property of absorbing neutrons. However, they provide a transient, counter reaction to the reactor output and when the reactor output is stepwise increased (decreased), the fission products temporarily decrease (increase) and thereafter increase (decrease) until the rate of generating the products has been saturated for the renewed reactor output. It takes several hours for this response to be completed and the predetermined load demand cannot be met unless the effect of the fission products as well as of the control rods and the recirculating flow is taken into account during the transient. Namely, the increase in the load, for example in a stepwise manner, can be followed up in a few minutes by increasing the recirculating flow, but in this case the change in the reactor load cannot be correctly followed unless the effect of the reactivity by the fission products taking place rather slowly for several hours is compensated. In such a case, the products decrease over 2 to 3 hours and the reactor output gradually increases though the positions of the control rods and the recirculating flow are both fixed. If the reactor is left uncontrolled, the members in the reactor core are overheated since the recirculating flow is fixed. In order to prevent the overheat, the control rods must be further inserted or the recirculating flow must be decreased. Such a danger of overheat usually takes place at high output performance so that the recirculating flow is decreased instead of further inserting the control rods, to maintain the reactor output constant. The decrease in the recirculating flow is continued until the products have begun to increase. After the products have begun to increase, the reactor output gradually decreases though the positions of the control rods and the recirculating flow are both fixed. In order to compensate for the decrease in the reactor output, the recirculating flow is again increased. These complicated operations are required whenever the reactor output is largely changed. Nothing has been described of the operations to diminish the reactor output, but it is a matter of course that similar complicated operations are needed to compensate for the influence by the fission products. Among these series of recirculating flow controls, it is when the reactor output is to be kept constant by decreasing the recirculating flow that the overheat of the members in the reactor must be prevented. Under such circumstances, since the recirculating flow is decreased while the reactor output is constant, then there is a danger of causing overheat in the members of the reactor due to the deficiency of recirculating coolant flow. As described above, when the reactor output is changed, there is needed a means for preventing the overheat of the members of the reactor, not only for the adjustment of the control rods but also for the recirculating flow control.

SUMMARY OF THE INVENTION

The object of the present invention which has been made to eliminate the conventional difficulties, is to provide a system for controlling the output of a reactor by which system the reactor output can be securely changed and the overheat of the members of the reactor, associated with the control of the recirculating flow, can be prevented.

According to the present invention, with a nuclear reactor whose output is controlled by controlling the positions of the control rods and the recirculating coolant flow, the minimum allowable recirculating flow for a particular reactor output is determined on the basis of the reactor output and when the actual recirculating flow is greater than the allowable minimum, the recirculating flow can be freely changed and when the actual recirculating flow becomes smaller than the allowable minimum, the further decrease in the recirculating flow is prevented and simultaneously the control rods are inserted, starting with the rod near the local power range monitor which delivers the greatest output.

DETAILED DESCRIPTION OF THE PREFERRED EMBODIMENT

Figure 1:
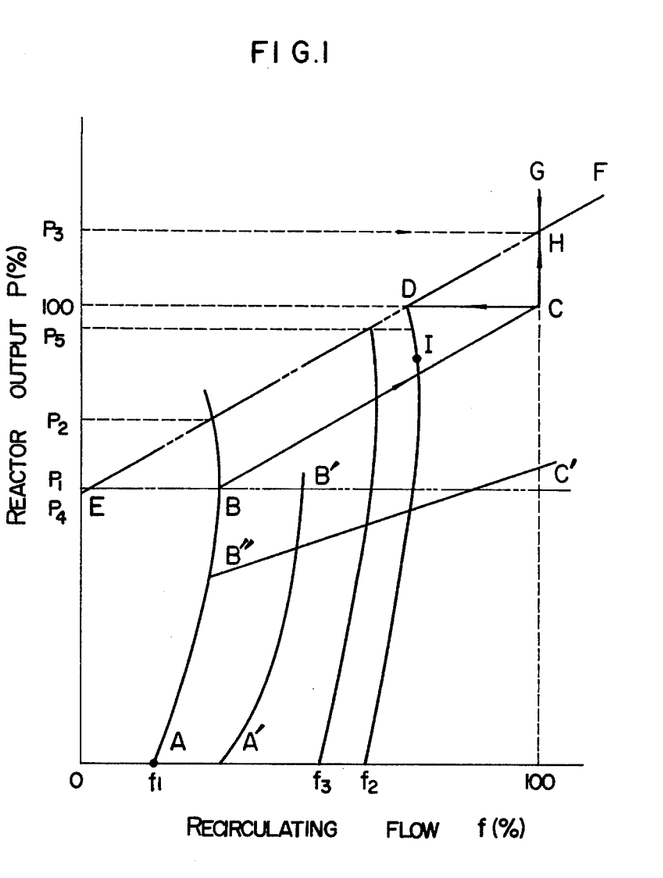
FIG. 1 shows the relationship between the reactor output P and the recirculating flow $f$, illustrating how the reactor output is changed by the control of the positions of the control rods and/or the recirculating flow and that the thermal limit is set to the cotrol of the recirculating flow as well as the control of the positions of the control rods.

As means for controlling the boiling-water reactor are employed the method of controlling the recirculating flow and the method of adjusting the positions of the control rods, as described above. FIG. 1 shows the relationships between the recirculating flow $f$ and the reactor output P, which are exhibited when the reactor output is changed.

The above two methods for controlling the reactor output are not simultaneously employed, but rather one of the two methods is employed while maintaining constant the controlled quantity of the other method. Namely, when the control of the reactor output is performed by means of control rods, the positions of the control rods are adjusted with the number of revolutions of a recirculation controlling pump being kept constant. The control according to this method is depicted by curves A-B and A'-B' in FIG. 1. As is seen from the curves, the recirculating flow becomes larger with an increase in the reactor output notwithstanding the constant revolution of the pump. This is because the natural circulation of the coolant is increased due to the increase in the reactor output. Although the withdrawal of control rods can cause an increase in the reactor output, the increase in reactor output by withdrawal must be restricted below a thermal withdrawal limit E-F as is known in the art and as is exemplified by U.S. Pat. No. 3,565,760. On the other hand, when the reactor output is controlled by the recirculation flow, the positions of control rods are fixed and the number of revolutions of the pump is varied. The control according to this method is depicted by curves B-C and B"-C' in FIG. 1, and these curves are approximately parallel to the thermal withdrawal limit curve E—F.

Now, let the case be considered where the reactor output P is increased from point A to point C representing the rated output. There are numerous paths possible between the two points. For example, the control rods are gradually withdrawn while the recirculating flow $f$ is kept constant at $f_1$, that is, the reactor output is increased, following the path starting from the point A and tracing the curve AB. In the state B, the control rods are withdrawn one after another in a predetermined order, so as to make the distribution of the reactor output constant. If the recirculating flow is then increased with the positions of the control rods fixed corresponding to the state B, the reactor output increases following the curve BC until it reaches the rated value at point C. The reactor output varies following the curve AB or A'B' when controlled by the control rods, but following the curve BC or B"C' when controlled by changing the recirculating flow.

As described above, a boiling-water reactor is able to control its output by the control rods or the recirculating flow of coolant, but only one of the means for control, i.e. adjusting the positions of the control rods or varying the recirculating flow individually, has a relatively narrow range of control since the fuel rods have a thermal limitation while the pump for controlling the recirculating flow has a mechanical limitation and since the radius distribution of the reactor output must be flattened. Accordingly, the reactor is controlled by changing the positions of the control rods when it is run delivering an output of not more than $P_1\%$ of the rated value and by changing the recirculating flow when it is operating at an output above $P_1\%$.

The two dot-dash line EF in FIG. 1 shows the upper limit up to which the control rods can be withdrawn under consideration of the thermal limitation of the fuel rods. If the control rods are further withdrawn to operate the reactor in a region above this line EF, e.g. above $P_2$ in the case of a given recirculating flow $f_1$, then there is a danger of the fuel assembly being thermally damaged. Therefore, the boiling-water reactor is equipped with a means which defines such a line as EF and prevents the control rods from being withdrawn beyond the limiting output determined by the instantaneous recirculating flow. This means is none other than the rod block monitor (RBM) described above.

Figure 2:
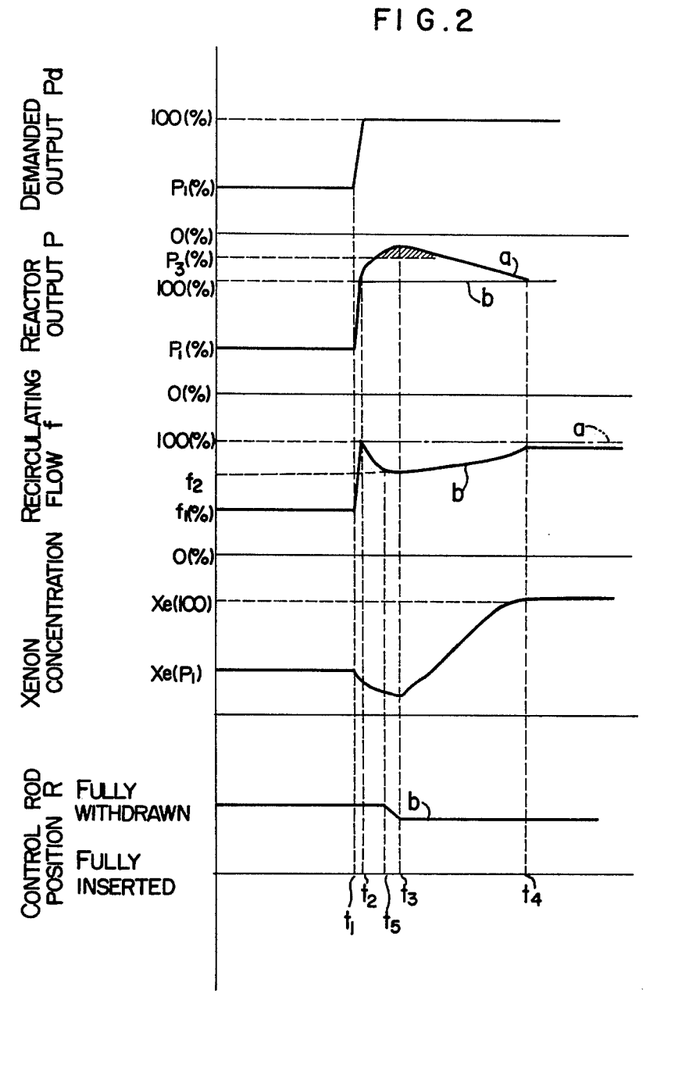
FIG. 2 are diagrams illustrating how the positions of the control rods and the recirculating flow should be controlled to compensate for the change in the reactor output due to the variation in the fission products when the reactor output is increased.

FIG. 2 shows how the reactor output P, the recirculating flow $f$, the xenon (one of the fission products) concentration Xe and the position R of the control rods are changed when the reactor output demand Pd varies from $P_1(\%)$ to the rated value 100 (%). Here, the position R of the control rods mentioned above is the average of the positions of the plural control rods. Let it be assumed that the reactor output demand Pd rises stepwise at time $t_1$, as shown in FIG. 2. If the recirculating flow $f$ is varied stepwise according to the demand Pd as indicated by dot-dash line $a$, the reactor output P reaches the rated value 100 (%) in about a few minutes (at time $t_2$). As a result of this increase in load, the xenon concentration Xe begins transition from the state $Xe(P_1)$ at the output of $P_1(\%)$ to the state Xe(100) at the output of 100 (%). This transition takes ten and several hours and the xenon concentration Xe temporarily decreases in the course of the transition. Since it is several minutes from $t_1$ to $t_2$ and since it is a few hours until the xenon concentration Xe becomes minimal at $t_3$, then the variation in the xenon concentration has no appreciable influence upon the reactor output in the period from $t_1$ to $t_2$ but affects the output during the period from the time ($t_2$) at which the change in load is completed to the time ($t_4$) at which the xenon concentration Xe reaches the value of 100. If the average position R of the control rods and the recirculating flow $f$ are both fixed while the xenon concentration Xe is varying, the reactor output P varies as indicated by the thick curved line $a$. That is, the output increases while the xenon concentration is decreasing ($t_1 - t_3$) and the output decreases while the xenon concentration is increasing ($t_3 - t_4$), until it reaches the rated value 100 (%). The change in the reactor output due to the variation of the xenon concentration can also be traced in FIG. 1: it starts from point B and reaches point C and thereafter follows the line C–C up and down. The point H is determined in view of the thermal limitation to the members of the reactor core at the 100% recirculating flow and the reactor output must not exceed the maximum allowable output $P_3$. The shaded area under the curve $a$ representing the reactor output P in FIG. 2 is the prohibited region. According to the present invention, therefore, the change in the reactor output due to the variation of the xenon concentrations is not left to take its own course but compensated by decreasing the recirculating flow. The same compensation can be effected also by the control of the positions of the control rods but the control by the control rods is not here used since it adversely affects the distribution of the output in the reactor.

Now, the present invention will be described in detail by way of embodiment with the aid of the attached drawings.

Figure 3:
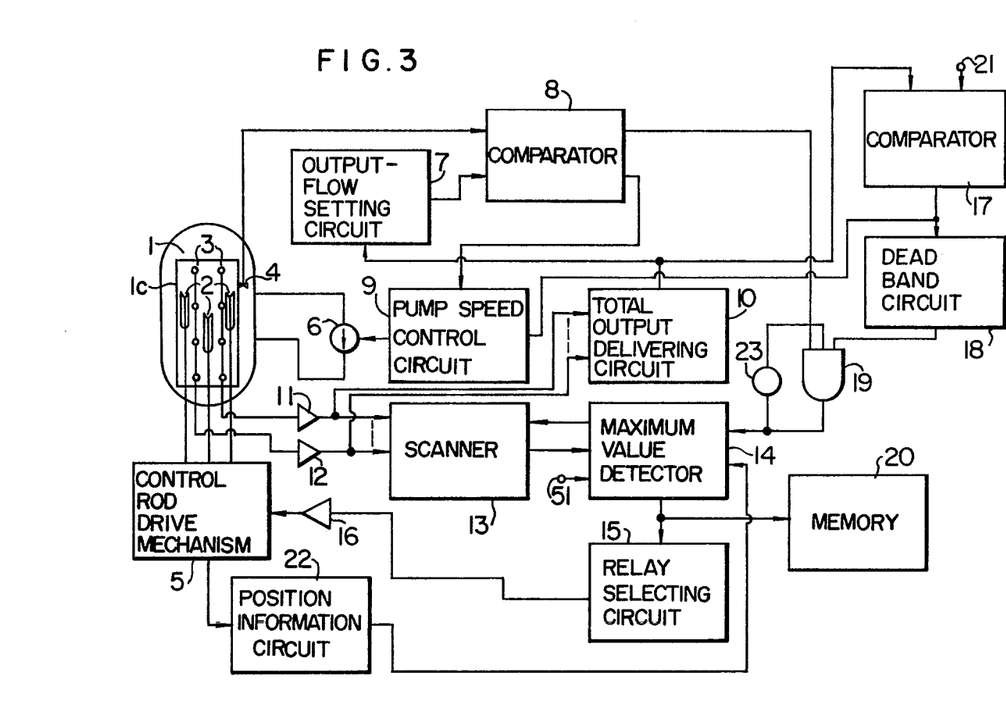
FIG. 3 shows a system for controlling the output of a reactor, as one embodiment of the present invention, which secures the thermal stability of the reactor while compensating for the change in the reactor output due to the variation in the fission products.
Figure 4A:
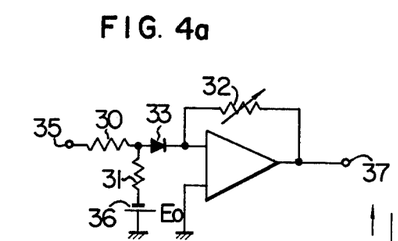
FIG. 4a is a concrete circuit of a means for determining the minimum allowable recirculating flow on the basis of the reactor output, which means is a part of the system shown in FIG. 3
Figure 5:
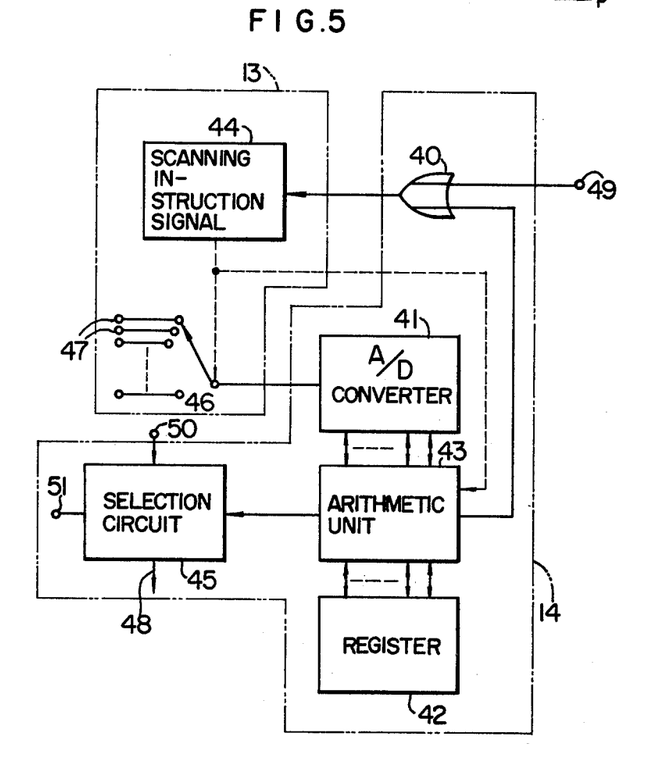
FIG. 5 is a concrete circuit of a means for determining the location of the particular one of the plural local power range monitors that delivers the maximum output, which means is a part of the system shown in FIG. 3.

FIG. 3 is a block diagram of a control system as an embodiment of the present invention. In FIG. 3 are shown a nuclear reactor with its core $1c$, control rods 2 for controlling the reactor output, local power range monitors 3 disposed in the vicinity of the fuel rods, a recirculating flow detector 4, a control rod drive mechanism 5 and a pump 6 for controlling the recirculating flow. All these parts are those used with a conventional boiling-water reactor. Reference numeral 7 indicates an output-flow setting circuit and an embodiment of the circuit is shown in FIG. 4a. Reference numeral 8 designates a comparator, 9 a pump speed control circuit, 10 a total output delivering circuit, and 11 and 12 amplifiers. These circuits can also be substituted by conventional equivalents. Numeral 13 denotes a scanner, 14 a maximum value detector whose circuit is shown in FIG. 5, 15 a relay selecting circuit for selecting at a time one of the control rod drive relays, 16 a buffer amplifier, 17 a comparator which delivers an output only when the reactor output exceeds the predetermined level, 18 a dead band circuit which delivers a logical sign "1" when the input exceeds the predetermined positive and negative levels, 19 an AND gate, 20 a memory, 21 a load demand signal input terminal, 22 a position information circuit which memorizes the positions of all the control rods, and 23 a timer. In FIG. 3, other apparatuses such as turbine control system and means for preventing the drawing of control rods are omitted since they are not closely concerned with the present invention.

The system having such a structure as described above operates as follows. First, let the case be considered where the reactor is run at a low output of $P_1$ up to time $t_1$ (as shown in FIG. 2) and thereafter it began to deliver an output of 100 (%) according to the increased load demand Pd (point C in FIG. 1). In this state, the load demand signal at the input terminal 21 has a value of 100 (%) so that the positions of the control rods and the recirculating flow are both fixed. Nevertheless, the reactor output tends to increase over a relatively long period of time due to the influence by fission products such as xenon and iodine, as described before.

This increase in the reactor output is detected by the local power range monitors 3 provided in the core 1c of the reactor 1. The outputs of the monitors 3 are amplified by the amplifiers 11, 12, . . . and the total output P from the reactor core is calculated by the total output delivering circuit 10. The output P of this circuit 10 is compared with the load demand signal Pd by means of the comparator 17. The deviation of the output P from the load demand signal Pd is applied to the pump speed control circuit 9 for controlling the recirculating flow and to the dead band circuit 18 for actuating the control rods. The output of the circuit 10, which is the total output of the reactor, is also applied to the output-flow setting circuit 7 whose details are shown in FIG. 4a.

The function of the circuit 7 will first be described, the concrete structure thereof being described later. In order to prevent the overheat of the members of the reactor core, a certain limit must be set to the reactor output if the recirculating flow is kept constant, as described above. Namely, the reactor output must not exceed the maximum allowable lever determined by each recirculating flow kept constant and the conventional means for stopping the withdrawal of the control rods is used to meet this requirement. Moreover, as described concerning the present invention, if the reactor output is kept constant, the recirculating flow must not be smaller than the minimum allowable flow determined corresponding to the fixed output. This last requirement occurs when the influence by the fission products is compensated after the reactor output is increased. In FIG. 1, the point C corresponds to the state of 100% reactor output and 100% recirculating flow and the recirculating flow must be decreased in order to compensate for the influence by xenon and to maintain the 100% output. This means that the recirculating flow should be decreased from point C toward point D. If the recirculating flow becomes smaller than $f_2$ corresponding to the point D, it crosses the boundary line EF for overheat prevention. The output-flow setting circuit 7 determines this line EF, that is, the circuit 7, when the reactor delivers a certain output, determines the minimum allowable flow corresponding to the output. In particular, in this circuit, as is shown by a characteristic curve of FIG. 4b, the recirculating flow is set at zero for a reactor output, and for outputs larger than the above reactor output, larger recirculting flows are set in accordance with the increase in the reactor output. Accordingly, a boundary setting signal representing the minimum allowable limit of the recirculating flow determined by the corresponding reactor output, is applied to the comparator 8. The boundary setting signal is compared with the flow signal detected by the recirculating flow detector 4, in the comparator 8. If the boundary setting signal is smaller than the flow signal, a signal for allowing the recirculating flow to decrease is applied to the pump speed control circuit 9, but if the boundary setting signal is greater than the flow signal, a signal for instructing the control rods to be actuated is applied to the AND gate 19. Namely, according to the invention, the influence by xenon is compensated by controlling the recirculating flow as much as possible (up to the boundary line EF), and only thereafter the control by the control rods is started. The insertion of the control rods at the point D is in the safe direction, only disturbing the distribution of the reactor output.

Now, let it be assumed that the recirculating flow is not yet decreased down to the point D in FIG. 1. Then, the pump speed control circuit 9 is selected. In this case, the pump speed is so controlled as to decrease the flow in accordance with the deviation signal from the comparator 17 so that the increase in the output due to the fission products is suppressed. However in case where the influence by the fission products cannot be completely compensated even if the flow is decreased to the point D in FIG. 1, the comparator 8 restricts at the point D the further decrease in the flow by the flow control signal and simultaneously applies to the AND gate 19 the signal for instructing the actuation of the control rods. The timer 23 normally delivers an output continuously and stops the output only for the predetermined time upon reception of the output from the AND gate 19. Therefore, the output of the AND gate 19 is in the form of a pulse. The predetermined time is so chosen as to be sufficient for shifting each control rod by a unit distance. One of the inputs of the AND gate 19 received the output from the dead band circuit 18 which delivers a signal "1" when the absolute value of the difference between the reactor output demand Pd and the reactor output exceeds a predetermined value. At the instant the AND gate 19 delivers its output, the maximum value detector 14 starts its operation. This circuit 14 receives the outputs from the local power range monitors 3 sequentially in a change-over manner so that the position of the monitor which delivers the maximum output is obtained. Then, the four control rods nearest to its position are selected. Thereafter, of the four control rods the predetermined one or the one whose distance of extraction is the greatest, is again selected and the signal representing the coordinate of the selected control rod is fed to the relay selecting circuit 15 and the memory 20. The relay selecting circuit 15 selects the relay which is to move the selected control rod. Namely, the exciting signals from the circuit 15 is amplified through the buffer amplifier 16 and then excites a hydraulic drive relay provided in the control rod drive mechanism 5 so that the above selected control rod is inserted by one unit distance in such a direction as to decrease the reactor output. If in this case it is desired to insert the rod by n unit distance, it is only necessary to lengthen the predetermined time of the timer correspondingly. If the above mentioned deviation of the output P does not vanish even after this process, the same process is repeated until the deviation is reduced to zero.

Figure 4B:
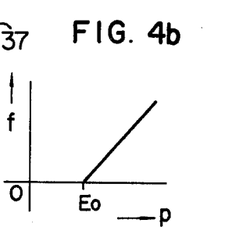
FIG. 4b shows the characteristic of the circuit.

Next, the detailed embodiments of the respective circuits in FIG. 3 will be described. FIG. 4 shows an embodiment of the output-flow setting circuit 7 in FIG. 3, which delivers no output since the diode 33 is kept reversely biassed until the input (the output of the total reactor output delivering circuit 10) applied to the terminal 35 becomes equal to the voltage $E_o$ of the bias source 36, and which delivers an output signal amplified by a ratio of the resistance value of the variable resistor 32 to that of the resistor 30, with respect to the input when the input is greater than $E_o$. The circuit 7 has a characteristic which is an inverse function with respect to the boundary line EF shown in FIG. 1. For example, in FIG. 1, let the reactor output P for the recirculating flow $f = 0$ be denoted by $P_4$ and the slope of the line EF by $a$. Then, the equation of the line EF is $P = af + P_4$. Solving this equation with respect to f, there is obtained an inverse function such that $f = 1/a \, (P - P_4)$. $E_o$ in FIG. 4a corresponds to $P_4$. FIG. 4b shows the characteristic of the output-flow setting circuit 7.

FIG. 5 shows embodiments of the scanner 13 and the maximum value detecting circuit 14 in FIG. 3, in combination. In FIG. 5 are shown an OR gate 40, an analog-digital (A/D) converter 41, a register 42, an arithmetic unit 43, a scanning instruction circuit 44, a selection circuit 45, and a scanner 46. The outputs of the local power range monitors fed from the amplifiers 11 and 12 are applied to the terminals 47. First, only one step of the scanner 46 scan by receiving a scanning start signal in the form of a pulse sent from the AND gate 19 to the scanning instruction circuit 44 through the terminal 49 and the OR gate 40 so that the first one of the outputs of the local power range monitors is converted to a digital quantity through the A/D converter 41. The register 42 has zero set in the first step but the arithmetic unit 43 serves to compare the output of the A/D converter 41 with that of the register 42 and to cause the larger one of them and in information of position to be stored in the register 42. Thus, the outputs of the local power range monitors are scanned and their values and the positions of the corresponding monitors are memorized, but the information of the positions is not contained in the signal applied to the terminal 47. This information is separately prepared, for example, by previously determining the order of scanning the outputs of the monitors and by establishing positional codes according to the order of scanning. Thereafter, the arithmetic circuit 43 delivers a pulse output to the OR gate 40 so as to perform the scanning of the next one step again. At the same time, the arithmetic circuit 43 counts the number of the steps.

These scanning and comparing actions are repeated sequentially until all of the monitor's outputs have been scanned, and thus after the last step we can detect the monitor having the maximum output, the positional code of which is transferred from the register 42 to the selection circuit 45. Then, the four control rods near the monitor whose output is the maximum, are selected. The selection circuit 45 reads the positions of the four control rods and their respective distances of withdrawal out of the positional information circuit 22 through the terminal 50, and deliveres at the terminal 48 the positional code of the control rod whose distance of withdrawal is the greatest (if the control rods have the same distance of withdrawal, the positional code of any one of the rods is delivered) or the positional code previously applied to te terminal 51.

As described above with the aid of FIG. 2, if the reactor output is left uncontrolled when it is increased according to a load demand, the output will soon exceed the predetermined value and enter the dangerous region. According to the present invention, the recirculating flow is decreased according to the deviation of the actual reactor output P from the output or load demand Pd so that P may be rendered equal to Pd. When the recirculating flow reaches the minimum allowable flow $f_2$, the recirculating flow is fixed and the control rods are inserted. The insertion begins with the control rods near a portion of the reactor core where the local output is the greatest, and is continued until the reactor output begins to decrease. If the reactor output is decreased, for example, down to $P_5$, the state of thereactor shifts from point D toward point I, as shown in FIG. 1. Since the minimum allowable flow $f_3$ for the output $P_5$ is smaller than $f_2$, the state of the reactor is on the safe side with respect to the boundary line EF. The comparator 8 compares $f_3$ with $f_2$, judges that $f_2$ is greater than $f_3$, and allows the recirculating flow to be freely controlled. In this case, the reactor output P is such that P < Pd, so that the recirculating fflow is increased. When the influence by xenon has been completely compensated, the condition that P = Pd is reached an then the control system stops its operation.

Figure 6:
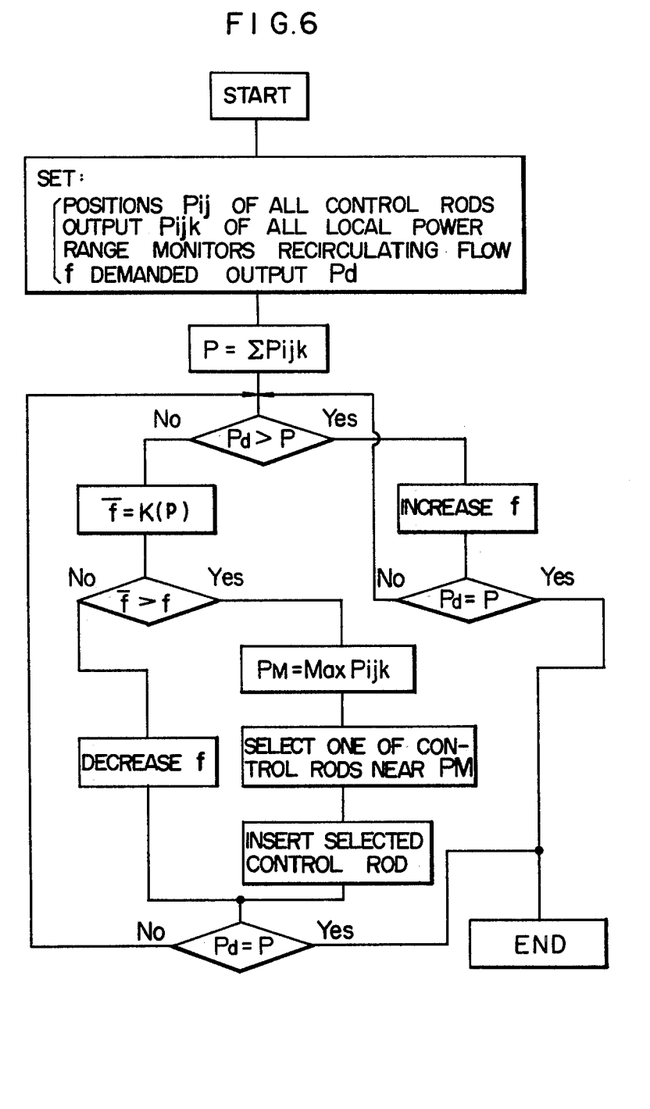
FIG. 6 is a flow chart used when the system according to the present invention is operated under the control of an electronic computer.

When it is desired to operate the control system described above by an electronic computer, the program based on the flow chart shown in FIG. 6 is necessary. No particular description of the flow chart is not given here since the chart is considered to the self-evident to those skilled in the art. The subscripts $i, j$ and $k$ attached to R and P indicate the three dimensioal postions in the reactor core, the notation $\Sigma$ designates summation, Max means calculating the maximum value, and $f$ denotes the minimum allowable recirculating flow defined as a function K(P) of output P.

As described above, according to the present invention, an idea underlying the rod block monitor is applied also to the control of the recirculating flow. Accordingly, the reactor output is so controlled that the fluctuation of the reactor output distribution due to the control by the control rods may be minimized. Consequently, the influence by the fission products can be securely and effectively suppressed. Therefore, the present invention has a great industrial merit when it is used in a reactor whose output is largely changed in accordance with variable load demand.

In the preceding description, the present control system has been explained as composed of a plurality of special unitws, but as shown in FIG. 6 the system may be partially or entirely replaced by an electronic computer. Moreover, the structure of the present control system is not limited to that shown in FIG. 3, but it has only to be that which permits the free control of the recirculating flow when the actual recirculating flow is greater than the minimum allowable flow predetermined in accordance with the reactor output, and exclusively performs the control by the control rods when the actual flow is smaller than the minimum allowable flow. Further, such a control system is also useful to prevent the change in the reactor output due to the fluctuation of the quantity of the neutron absorbing substance in the reactor core during the period when a constant output running is carried out without any controls by recirculating flow and control rods.

We claim:

1. A system for controlling the output of a boiling-water reactor comprising a reactor core, flow controlling means for controlling the flow of coolant through said reactor core, first detector means for detecting said actual coolant flow and providing an output indicative thereof, second detector means for detecting the output of said reactor and providing an output indicative thereof, and an output controlling means responsive to the outputs of said first and second detector means and a demanded output of said reactor for applying an output control signal to said flow controlling means, said output controlling means including first means responsive to the output of said second detector means for outputting as a limiting value of coolant flow a signal representing a zero coolant flow when said output of said second detector means is smaller than a predetermined reactor output and representing a larger coolant flow with the increase of the output of said second detector means when the output of said second detector means is larger than said predetermined reactor output, second means for comparing the output of said first means with the output of said first detector means, and a third means for comparing said detected reactor output of said second detector means with said demanded output of said reactor, said output controlling means supplying said flow controlling means with a control signal instructing the reduction of coolant flow when an actual coolant flow is larger than said limiting value of coolant flow and said detected reactor output of said second detector means is larger than said demanded output of said reactor.

2. A system for controlling the output of a boiling-water reactor as claimed in claim 1, wherein said flow controlling means controls the recirculating flow of coolant, said first detector means detects said recirculating coolant flow, said first means outputs a signal as a limiting value of recirculating coolant flow, and said output controlling means provides a control signal instructing the reduction of recirculating coolant flow.

3. A system for controlling the output of a boiling-water reactor as claimed in claim 2, wherein said output controlling means applies a control signal corresponding to the deviation of said detected reactor output from said demanded output of said reactor to said recirculating flow controlling means.

4. A system for controlling the output of a boiling-water reactor as claimed in claim 2, wherein said output controlling means applies a control signal inhibiting the reduction of recirculating flow to said recirculating flow controlling means when said actual recirculating flow is at least one of equal to and smaller than said limiting value of recirculating flow.

5. A system for controlling the output of a boiling-water reactor as claimed in claim 3, wherein said output controlling means applies a control signal inhibiting the reduction of recirculating flow to said recirculating flow controlling means when said actual recirculating flow is at least one of equal to and smaller than said limiting value of recirculating flow.

6. A system for controlling the output of a boiling-water reactor as claimed in claim 4, further comprising a plurality of control rods in said reactor core and a control rod controlling means for controlling the insertion and withdrawal of said control rods into and out of said reactor core, said output controlling means including an additional means for applying a control signal to said control rod controlling means, instructing the insertion of control rods into said reactor core when said actual recirculating flow becomes at least one of equal to and smaller than said limiting value of recirculating flow.

7. A system for controlling the output of a boiling-water reactor as claimed in claim 5, further comprising a plurality of control rods in said reactor core and a control rod controlling means for controlling the insertion and withdrawal of said control rods into and out of said reactor core, said output controlling means including an additional means for applying a control signal to said control rod controlling means, instructing the insertion of control rods into said reactor core when said actual recirculating flow becomes at least one of equal to and smaller than said limiting value of recirculating flow.

8. A system for controlling the output of a boiling-water reactor as claimed in claim 6, wherein said additional means applies a control signal corresponding to the deviation of said detected reactor output from said demanded output of said reactor to said control rod controlling means to insert said control rods into said reactor core.

9. A system for controlling the output of a boiling-water reactor as claimed in claim 7, wherein said additional means applies a control signal corresponding to the deviation of said detected reactor output from said demanded output of said reactor to said control rod controlling means to insert said control rods into said reactor core.

10. A system for controlling the output of a boiling-water reactor as claimed in claim 6, wherein said second detector means for detecting the output of said reactor includes a plurlity of local output detectors arrangged in the proximity of said plurality of control rods in said reactor core for detecting local outputs of said reactor and the insertion of said control rods into said reactor core begins with the control rods near the particular one of said local output detectors whose output is the greatest.

11. A system for controlling the output of a boiling-water reactor as claimed in claim 7, wherein said second detector means for detecting the output of said reactor includes a plurality of local output detectors arranged in the proximity of said plurlity of control rods in said reactor core for detecting local outputs of said reactor and the insertion of said control rods into said reactor core begins with the control rods near the particular one of said local output detectors whose output is the greatest.

12. A system for controlling the output of a boiling-water reactor as claimed in claim 8, wherein said second detector means for detecting the output of said reactor includes a plurality of local output detectors arranged in the proximity of said plurality of control rods in said reactor core for detecting local outputs of said reactor and the insertion of said control rods into said reactor core begins with the control rods near the particular one of said local output detectors whose output is the greatest.

13. A system for controlling the output of a boiling-water reactor as claimed in claim 9, wherein said second detector means for detecting the output of said reactor includes a plurality of local output detectors arranged in the proximity of said plurality of control rods in said reactor core for detecting local outputs of said reactor and the insertion of said control rods into said reactor core begins with the control rods near the particular one of said local output detectors whose output is the greatest.

* * * * *